United States Patent [19]
Kawamura

[11] 4,053,411
[45] Oct. 11, 1977

[54] AUTOMATIC CENTRIFUGE SAFETY LATCH SYSTEM

[75] Inventor: Tadashi Kawamura, Nagoya, Japan

[73] Assignee: Tokyo Shibaura Electric Co., Ltd., Kawasaki, Japan

[21] Appl. No.: 703,246

[22] Filed: July 7, 1976

[30] Foreign Application Priority Data

July 10, 1975 Japan .................... 50-84873
Dec. 15, 1975 Japan .................... 50-169692[U]
Mar. 10, 1976 Japan .................... 51-28480[U]

[51] Int. Cl.² ............................................. B01D 45/12
[52] U.S. Cl. ................................... 210/146; 192/136; 210/368
[58] Field of Search ................. 210/360 R, 146, 368, 210/143, 145; 192/136, 135

[56] References Cited

U.S. PATENT DOCUMENTS

| | | | |
|---|---|---|---|
| 1,882,123 | 10/1932 | Defibaugh | 192/136 |
| 2,004,064 | 6/1935 | Jordan et al. | 210/146 |
| 2,907,464 | 10/1959 | Ellis | 210/146 |
| 3,115,457 | 12/1963 | Simons | 192/136 |
| 3,272,296 | 9/1966 | Fredholm | 210/146 |
| 3,332,555 | 7/1967 | O'Conor et al. | 210/146 |
| 3,795,985 | 3/1974 | Hasebe et al. | 196/136 |

FOREIGN PATENT DOCUMENTS

1,225,485  5/1959  France ................... 210/146

Primary Examiner—Frank W. Lutter
Assistant Examiner—Frank Sever
Attorney, Agent, or Firm—Cushman, Darby & Cushman

[57] ABSTRACT

A centrifugal dehydrator comprising a spin basket disposed within an outer casing so as to be driven by a motor, an outer lid for opening and closing an opening of the outer casing facing the spin basket, an inner lid for opening or closing, inside the outer lid, the opening of the outer casing, a movable member capable of being moved to an original position in response to the releasing or opening of the outer lid and movable to a displaced position in response to the closing of the outer lid, rotation-detecting means for, when the power supply to the motor is cut off, permitting the movable member to be kept located at the displaced position by rotation of the spin basket due to inertia, and a lock mechanism for locking the inner lid so as to make it unable to be opened while the rotation-detecting means is keeping the movable member located at the displaced position.

12 Claims, 17 Drawing Figures

AUTOMATIC CENTRIFUGE SAFETY LATCH SYSTEM

This invention relates to a centrifugal dehydrator in which measures are taken for preventing the occurrence of dangers resulting from the rotation of a spin basket due to inertia.

Conventionally, a centrifugal dehydrator is provided with a lid for opening or closing an opening for throwing articles or substances to be dehydrated into a rotatable spin basket within an outer casing, said lid being designed to close for safety the opening while the spin basket is making high speed rotation by a motor. In this construction, the lid can be readily opened during the dehydration operation, and there is a great danger that, under the condition in which the lid is opened, an operator touches the spin basket under high speed rotation to get hurt.

For preventing the above danger, a centrifugal dehydrator has been proposed which comprises an inner lid for directly opening or closing the opening, an outer lid for indirectly opening or closing the opening from above the inner lid, a switch mechanism for cutting off the power supply to a motor in response to the opening operation of the outer lid, and a brake mechanism for braking the spin basket in response to the opening operation of the outer lid. In this type of centrifugal dehydrator, the power supply to the motor is interrupted and a brake force acts on the spin basket simultaneously with the releasing or opening of the outer lid whereby the above-mentioned danger is more or less reduced. Since, however, the spin basket, even after said interruption of the power supply to the motor continues its rotation due to inertia for serveral seconds, there still exists a danger that the operation gets hurt during the inertial rotation.

A primary object of the invention is to provide a highly safe centrifugal dehydrator provided with a safety mechanism for keeping, even after the power supply to the motor is cut off, an inner lid locked at a closed position so long as the spin basket is rotating due to inertia.

Another object of the invention is to provide a centrifugal dehydrator provided with a second safety mechaism for keeping the inner lid located at a locked position when said first safety mechanism has become inoperable owing to the occurrence of troubles.

Embodiments of the invention will now be described by reference to the accompanying drawings in which.

Figure 1:
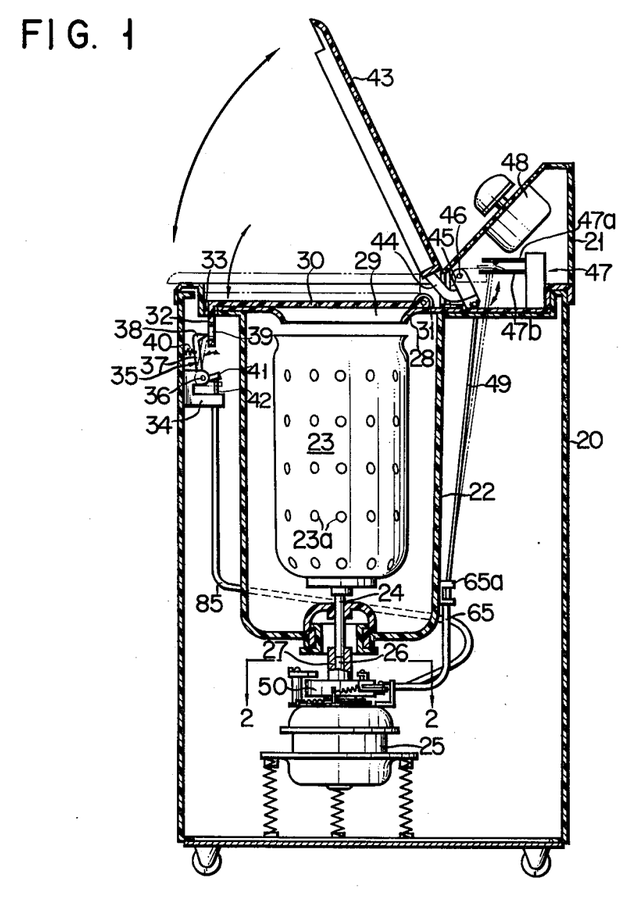
FIG. 1 is a vertical sectional view of a centrifugal dehydrator according to an embodiment of the invention.

A centriqugal dehydrator shown in FIG. 1 comprises an outer casing 20 attached with a control box 21 at its rearward upper end, a dehydration tank 22 fixedly disposed within the outer casing, and a spin basket 23 rotatably disposed within the tank 22 and formed with a number of bores 23a. At a lower end of the spin basket 23 is fixed a shaft 24, which is connected through a coupling 27 to a motor shaft 26 of an electric motor 25 held on the inner bottom section of the outer casing 20. On the upper face of the dehydration tank 22 is fitted an upper plate 28, which has at its portion facing the spin basket 23 an opening 29 for throwing therethrough articles or substances to be dehydrated into the spin basket 23. An inner lid 30 for directly opening or closing the opening 29 has one end pivotally supported on a support portion 31 provided for the upper plate 28. From the free end of the inner lid 30 is downwardly extended an engagement portion 32, which is insertable into the outer casing 20 through a bore 33 formed at an upper end of the dehydration tank 22. A bracket 34 is fixed on the inner wall of the outer casing 20 pivotally supports a substantially L-shaped lock lever 35 by means of a pin 36. One arm 37 of the lock lever 35 has a hook 38 at its tip end, said hook being engageable with a engagement hole 39 formed in the engagement portion 32 of the inner lid. Between the arm 37 and the inner wall of the outer casing 20 is stretched a tension spring 40, which is pulling the arm 37 in a direction permitting the hook 38 to escape or disengage from the engagement hole 39. To the other arm 41 of the lock lever 35 is connected one end of a wire 42, the other end of which is connected to an operating device associated with a brake mechanism as later described. An outer lid 43 for indirectly opening or closing the opening 29 from outside the inner lid 30 has a hinge portion 44 at its rearward end, said hinge portion being pivotally supported, through a pivot pin 46, on a pair of support arms 45 (In FIG. 1, only one is shown) disposed within the control box 21. Within the control box 21 is further disposed a switch mechanism 47, which has a pair of contact arms 47a, 47b which, when the outer lid 43 is closed, are mechanically closed by the hinge portion 44 of the outer lid. The switch mechanism 47 is connected, as well known, to a known timer 48, the motor 25 and a not shown power source in series. To the hinge portion 44 of the outer lid is connected one end of a wire 49, the other end of which is connected to the brake mechanism, as later described.

Figure 2:
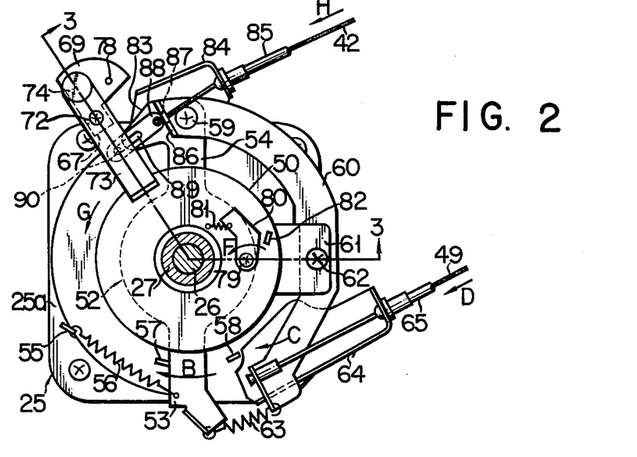
FIG. 2 is a detailed sectional view taken along the line 2—2 of FIG. 1, showing a brake mechanism and its associated parts when the centrifugal dehydrator is out of operation.
Figure 3:
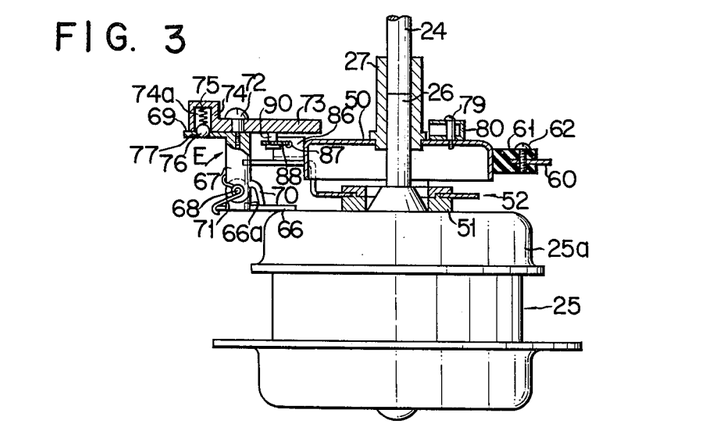
FIG. 3 is a sectional view taken along the line 3—3 of FIG. 2.

FIGS. 2 and 3 show in detail the brake mechanism for braking the spin basket 23, and its associated parts. To the lower end of the coupling 27 is fixed, for example, by welding a brake drum 50 so as to permit the motor shaft 26, accordingly the spin basket 23 to be rotated integrally therewith. On an upper face of a housing 25a of the motor 25 is fixed a support ring 51 (FIG. 3), which supports a movable member or movable plate 52 so as to permit it to be rockable concentrically with the motor shaft 26. From the movable plate 52 are radially outwardly extended a pair of arms 53, 54. Between one arm 53 and a projection 55 of the motor housing 25a is stretched a tension spring 56 for always urging the movable plate 52 in a direction indicated by an arrrow B in FIG. 2. From the motor housing 25a are upwardly extended a pair of stops 57, 58, one stop 57 of which is designed to limit the rocking movement of the arm 53 in the direction indicated by the arrow B and the other 58 of which is designed to limit the rocking movement of the arm 53 in the opposite direction to that indicated by the arrow B. To the other arm 54 of the movable plate 52 is rockably pivoted one end of a brake lever 60 through a screw 59. To the substantially intermediate portion of the brake lever 60 is fixed a brake shoe 61 through a screw 62. Between the other end of the brake lever 60 and the arm 53 of the movable plate 52 is stretched a tension spring 63, which always urges the brake lever 60 in a direction indicated by an arrow C in FIG. 2 so as to permit the brake shoe 61 to be frictionally pressed against the brake drum 50. The tension spring 63 is designed to have a higher tension than the tension spring 56. To a bracket 64 attached to the motor housing 25a is fixed one end of a flexible pipe 65, the other end of which is fixed to the dehydration tank 22 by means of a bracket 65a (FIG. 1). Within the pipe 65 is received the wire 49, said other end of which is connected to said other end of the brake lever 60. When the outer lid 43 (FIG. 1) is closed to permit the wire 49 to be pulled in a direction indicated by an arrow D in FIG. 2, the movable plate 52 is first rocked in the opposite dirrection to that indicated by the arrow B against the biasing force of the spring 56 through the brake lever 60 until the arm 53 is allowed to abut the stop 58, and thus reaches the position of FIG. 4, namely, its displaced position (At this time, the brake lever 60 is brought to a chain line-indicated position of FIG. 4). When the wire 49 is further pulled in the arrow D-indicated direction, the brake lever 60 is then rocked in the opposite direction to that indicated by the arrow C to cause the brake shoe 61 to be separated from the brake drum 50 (namely, the brake shoe 61 is brought to a solid line-indicated position). Conversely, when the outer lid 43 starts to be opened to loosen the wire 49, the brake shoe 61 is first pressed against the brake drum 50 by means of the spring 63, and then the movable lever 52 is rocked by the spring 56 in the arrow B-indicated direction to return to its position of FIG. 2, namely, its original position. In this way, the movable lever 52 is moved to its displaced position of FIG. 4 in response to the closing operation of the outer lid 43 and is returned to its original position of FIG. 2 in response to the opening operation of the outer lid 43.

Figure 4:
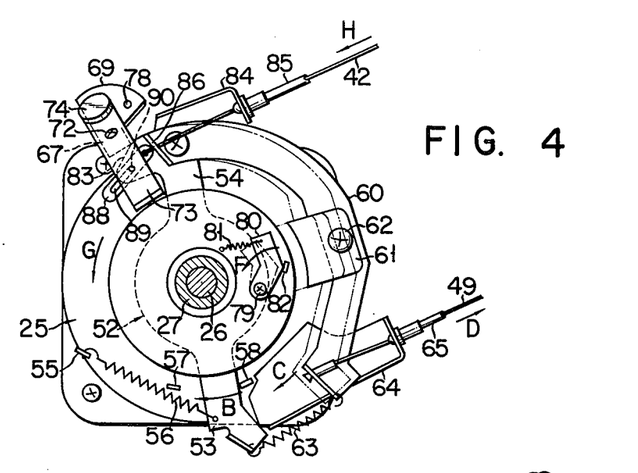
FIG. 4 is a view similar to FIG. 2, showing a condition in which the centrifugal dehydrator is in operation.
Figure 5:
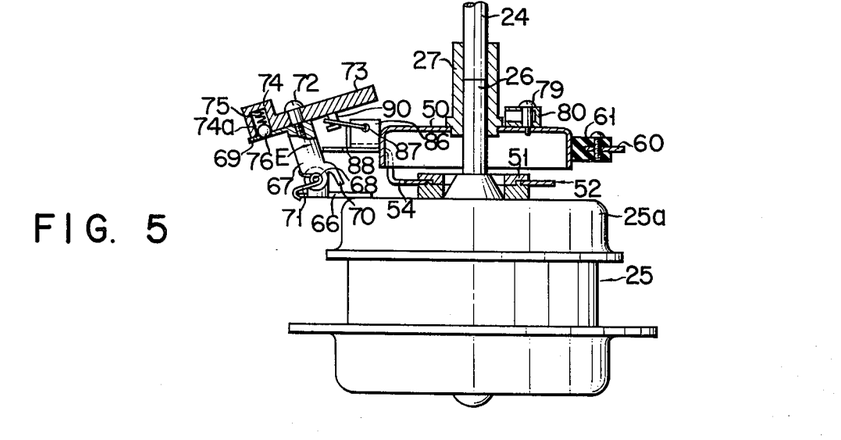
FIG. 5 is a vertical sectional view of FIG. 4.

As shown in FIG. 3, to a motor housing 25a is fixed a support member 66 having a pivotally supporting portion 66a. On a pivotally supporting portion 66a is rockably supported through a pin 68 a rocking lever 67, which has at its upper end a substantially sectorial plate 69 (FIG. 2) and has at its lower end an inverted L-shaped stop leg 70. A torsion spring 71 provided for the pin 68 urges the rocking lever 67, in a direction indicated by an arrow E, up to a position at which the leg 70 abuts on the support member 66, namely, the position of FIG. 3. On the plate 69 is attached through a screw 72 an operating lever 73 so as to be rockable about the screw 72. The operable lever 73 has a cylindrical projection 74, which has a downwardly opened hole 74a. Within the hole 74a is received a ball 76 urged against the plate 69 by a compression spring 75. The plate 69 is bored with two through holes 77, 78 each having a smaller diameter than the ball 76, and this ball is normally engaged with the hole 77 so as to keep the operating lever 73 at the position of FIG. 2 relative to the plate 69. On the upper face of the brake drum 50 is rockably attached through a screw 79 one end of an abutment member 80. A tension spring 81 having a relatively low tension normally urges the abutment member 80 in a direction indicated by an arrow F to keep the member 80 at the position of FIG. 2, namely at its inner position. When the brake drum 50 is rotated, the other end of the abutment member 80 is rocked by the centrifugal force to be displaced to a position at which it abuts on a stop 82, namely, its outer position (FIG. 4). On the arm 54 of the movable plate 52 is formed a cam surface 83 facing the rocking lever 67. The cam surface 83, when the movable plate 52 is located at its original position of FIG. 2, is spaced apart from the rocking lever 67, and accordingly the operating lever 73 is kept at its substantially horizontal original position by the action of the torsion spring 71. At this original position, a tip end of the lever 73 is situated within a locus described by the rotating abutment member 80 rocked by the centrifugal force. On the other hand, when the movable plate 52 is moved to its displaced position of FIG. 4, the cam surface 83 causes the rocking lever 67 to be rocked against the biasing force of the spring 71 in the opposite direction to that indicated by the arrow E, thereby causing the operating lever 73 to be brought to its inclined displaced position as shown in FIG. 5. At this displaced position, the tip end of the lever 73 leaves said locus described by the abutment member 80. To a bracket 84 provided for the motor housing 25a is fixed one end of a flexible pipe 85, the other end of which is connected to the bracket 34 (FIG. 1) fixed to the outer casing 20. The wire 42 connected at one end to the lock lever 35 is received within the pipe 85. The other end of the wire 42 is freely passed through a through bore 87 (FIG. 2) formed in an erected portion 86 provided on the brake lever 60 and is connected to a connection plate 88 so as to be prevented from being disengaged from the through bore 87. The plate 88 has an elongate slot 89, with which is engaged a projection 90 (FIG. 3) extending from the operating lever 73. The projection 90 has an enlarged portion at its lower end so as to be prevented from being disengaged from the slot 89.

The operation of this embodiment will hereinafter be explained.

After articles or substances to be dehydrated (not shown) are thrown into the spin basket 23 through the opening 29 under the condition in which the outer lid 43 and the inner lid 30 are opened, the inner lid 30 and the outer lid 43 are closed. As the outer lid 30 is closed, the wire 49 is pulled in the arrow D-indicated direction of FIG. 2 to cause the movable plate 52 to be rotated against the biasing force of the spring 56 up to the displaced position of FIG. 4 in the opposite direction to that indicated by the arrow B. Since, at this time, the wire 42 is pulled in a direction indicated by an arrow H by means of the connection plate 88 abutting on the erected portion 86, the lock lever 35 (FIG. 1) is rocked against the biasing force of the spring 40 to cause the hook 38 to be engaged with the engagement hole 39 of the inner lid 30, thereby to lock the inner lid 30 to its closed position. This locked condition persists at least while the outer lid 43 is being closed. On the other hand, as the movable plate 52 is rotated as described above, the cam surface 83 causes the rocking lever 67 to be rocked in the opposite direction to that indicated by the arrow E, thereby causing the operating lever 73 to be moved up to the position as shown in FIGS. 4 and 5. When, after the movable plate 52 is rotated up to its displaced position of FIG. 4, the wire 49 is further pulled by the outer lid 43 in the arrow D-indicated direction, the brake lever 60 is rocked against the biasing force of the spring 63 from the chain line-indicated position to the solid line-indicated position of FIG. 4 to cause the brake shoe 61 to be separated from the brake drum 50. At this time, the brake drum 50, accordingly, the spin basket 23 is made freely rotatable. When the outer lid 43 is fully brought to its closed position, the switch mechanism 47 is closed and in accordance with the operation of the timer 48 the motor 25 starts to drive the spin basket 23. During the dehydration operation, the abutment member 80 is rotated in a direction indicated by an arrow G jointly with the brake drum 50 to be kept at its outer position indicated by a solid line of FIG. 4 due to the action of the centrifugal force. At this time, since the operating lever 73 is kept at its displaced position shown in FIG. 5 by means of the cam surface 83, the abutment member 80 is prevented from abutting on the operating lever 73.

When, after completion of the dehydration operation or during the dehydration operation, the outer lid 43 is opened, the switch mechanism 47 is caused to operate to break off the power supply to the motor 25. Simultaneously, the wire 49 is loosened, which permits the spring 63 to bring the brake lever 60 to the chain line-indicated position of FIG. 5 owing to the biasing force, thereby to cause the brake shoe 61 to be frictionally pressed against the brake drum 50. By the way, immediately after the power supply to the motor 25 is broken off, the spin basket 23, accordingly the brake drum 50 continues to be rotated due to the inertia. For this reason, when the brake shoe 61 is pressed against the brake drum 50, a force of rotation in the arrow G-indicated direction is transmitted from the brake drum 50 to the brake shoe 61 due to the frictional force and is further transmitted to the arm 54 of the movable plate 52 through the brake lever 60 and the screw 59. Therefore, while the brake drum 50 is rotating due to the inertia, the movable plate 52 is kept at its displaced position of FIG. 4 against the biasing force of the spring 56 to permit the wire 42 to be kept at the pulled condition. In this way, the lock lever 35 causes the inner lid 30 to be locked to its locked condition not only during the dehydration operation but also during the rotation of the brake drum 50 due to the inertia after opening of the outer lid 43.

When the rotation of the spin basket 23, accordingly the brake drum 50 is stopped by means of the brake shoe 61, the rotational force having theretofore permitted the movable plate 52 to be kept at its displaced position is lost with the result that the movable plate 52 is rotated in the arrow B-indicated direction due to the biasing force of the spring 56 to be returned to the original position. In accordance with the returning movement of the movable plate 52, the cam surface 83 is separated from the rocking lever 67 to cause the torsion spring 71 to rock the rocking lever 67 in the arrow E-indicated direction to bring the same 67 to the position of FIG. 3. As a result, the operating lever 73 is returned to the original position (FIG. 3) situated within the rotational locus described by the abutment member 80 kept located at its outer position. Further, the lock lever 35 (FIG. 1) is disengaged from the inner lid 30 due to the biasing force of the spring 40, thereby to render the inner lid 30 operable. Thereafter, the inner lid 30 is opened and dehydrated articles or substances such as clothing is taken out from the spin basket 23.

Figures 6, 7:
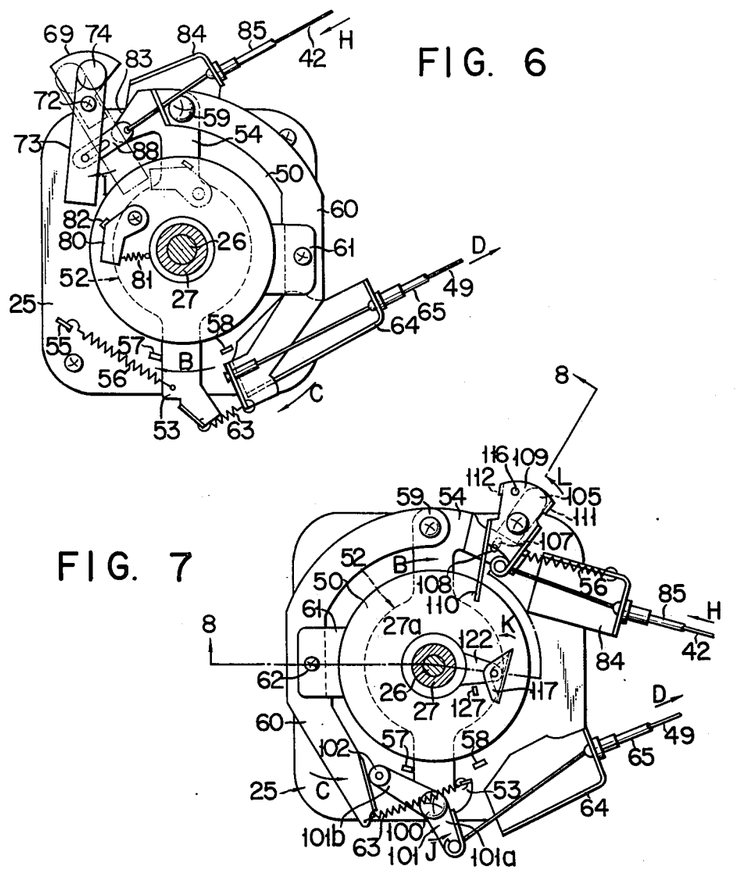
FIG. 6 is a view similar to FIG. 2, showing a condition in which first rotation detection means goes wrong.
FIG. 7 is a view similar to FIG. 2, showing a modification of said embodiment.

When, owing to a long use, the brake shoe 61 is worn to a greater extent than specified, even if the brake shoe 61 is pressed against the rotating brake drum 50, a sufficiently great force of friction ceases to be produced between both. Therefore, despite the rotation of the brake drum 50 due to the inertia, the movable plate 50 is returned to the original position (FIG. 2) due to the biasing force of the tension spring 56. As a result, there would occur a danger that the inner lid 30 is unlocked during the rotation of the brake drum. But, when such an unexpected trouble takes place, the cam surface 83 is disengaged from the rocking lever 67 to permit the operating lever 73 to be moved up to its original position indicated by a chain line of FIG. 6 due to the biasing force of the tension spring 71. Since, during the rotation of the brake drum 50, the abutment member 80 is located at its outer position as shown in FIG. 6, the abutment 80 is at once allowed to abut on the tip end of the operating lever 73 kept located at its original position (See the chain line-indicated position of FIG. 6). This causes the operating lever 73 to be rocked about the screw 72 up to the solid line-indicated position of FIG. 6, namely, up to its operating position in a direction indicated by an arrow I. Simultaneously, the ball 76 is moved from the through hole 77 to the through hole 78 to keep the operating lever 73 at the operating position. When, in this way, the operating lever 73 is displaced to the operating position, the wire 42 is pulled by means of the connection plate 88 in a direction indicated by an arrow H to permit the lock lever 35 (FIG. 1) to be kept in a condition engaged with the inner lid 30.

The above-mentioned operation of the operating lever 73 is performed not only where the tight engagement between the brake shoe 61 and the brake lever has been lost but also where the tension spring 63 or screw 59 has been damaged.

When the operating lever 73 has been displaced to the operating position, the lock lever 35 continues to lock the inner lid 30 to the closed position, and the operator is unable to open the inner lid 30 despite the stoppage of the rotation of the spin basket 23 due to the inertia. As a result, he can know the occurrence of abnormalities. The operating lever 73 is manually rocked to the original position of FIG. 2 before or after the troubled portion is repaired.

As above stated, in this embodiment, the brake shoe 61, brake drum 50, brake lever 60 and their respective associated parts constitute, in cooperation with each other, first rotation-detecting means for detecting the inertial rotation of the spin basket 23 at the time of normal operation to keep the movable plate 52 located at the displaced position, while the abutment member 80, operating lever 73 and their respective associated parts constitute, in cooperation with each other, second rotation-detecting means for detecting the inertial rotation of the spin basket 23 at the time of abnormal operation to keep the lock lever 35 located at the locking position.

FIGS. 7 to 13 show a modification of the brake mechanism and its associated parts of the above-mentioned embodiment. The wires 42, 49 of FIG. 7 are connected to a not shown lock lever similar to the lock lever 35 of FIG. 1 and a not shown outer lid similar to the outer lid 43, respectively. In the above-mentioned embodiment, the brake lever 60 is extended clockwise from the screw 59, whereas, in this modification, the brake lever 60 is extended counterclockwise from the screw 59. Since, however, the brake lever of this modification performs substantially the same function as in the case of the brake lever of the above-mentioned embodiment, it is labelled the same reference numeral. Similarly, in this modification, substantially the same parts as those of the embodiment are labelled the same reference numerals even if more or less different in configuration, and a detailed description thereof is omitted.

Referring to FIG. 7, the tension spring 56 for urging the movable plate 52 to its original position is stretched between the arm 54 of the movable plate 52 and the bracket 84. On the other hand, a rocking lever 101 is rockably attached to the arm 53 of the movable plate 52 through a screw 100, and to one arm 101a of the rocking lever 101 is connected one end of the wire 49. The other arm 101b of the rocking lever 101 rockably supports a roller 102, which is engaged with the inner edge of the brake lever 60. The tension spring 63 stretched between the brake lever 60 and the arm 53 normally permits the brake shoe 61 to be pressed against the brake drum 50 and simultaneously causes the rocking lever 101 to be displaced to the position of FIG. 7. When the wire 49 is pulled in a direction indicated by the arrow D, the movable plate 52 is moved to the displaced position of FIG. 10 against the biasing force of the spring 56 and in sequence the rocking lever 101 rocked in a direction indicated by an arrow J against the biasing force of the tension spring 63 to cause the brake lever 60 and brake shoe 61 to be moved from the chain line-indicated position to the solid line-indicated position of FIG. 10.

In this modification, the second rotation-detecting means is different from that of the above-mentioned embodiment. Hereinafter, the second rotation-detecting means is explained in detail.

Figure 8:
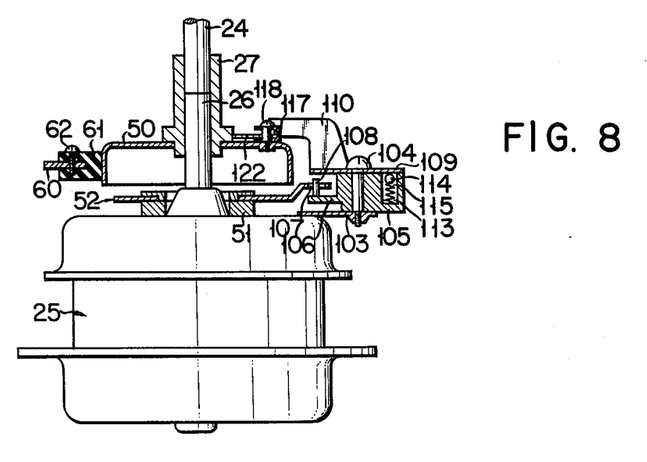
FIG. 8 is a sectional view taken along the line 8—8 of FIG. 7.

As shown in FIG. 8, to the motor housing 25a of the motor 25 is fixed a support plate 103, on which a rocking lever 105 is rockably supported through a screw 104. From the rocking lever 105 is extended an arm 106, which has a pin 108 engaged with a slot 107 provided for the arm 54 of the movable plate 52. Therefore, the rocking lever 105 is rocked in response to the rocking movement of the movable plate 52 as later described. To the upper face of the rocking lever 105 is rockably attached through the screw 104 an operating lever 109 corresponding to the operating lever 73 of the above-mentioned embodiment. On an upper part of the operating lever 109 is formed a rising portion 110 extending over the brake drum 50. On both side edges of the operating lever are formed a pair of downwardly extending stop portions 111, 112, which are designed to limit the rocking amount of the operating lever 109 relative to the rocking lever 105. The wire 42 is connected to the operating lever 109 and normally pulls it so as to permit the stop portion 111 to abut against the movable lever 105. In the movable lever 105 is formed a cylindrical concave section 113 which is opened upwards. In the concave section 113 is disposed a ball 114, which is pressed against the under side of the operating lever 109 owing to the biasing force of a compression spring 115. In the operating lever 109 is formed a bore 116 having a smaller diameter than the ball 114, and this ball 114 is brought into engagement with the bore 116 when the operating lever 109 has been rocked until the stop portion 112 is allowed to abut on the rocking lever 105.

Figure 9:
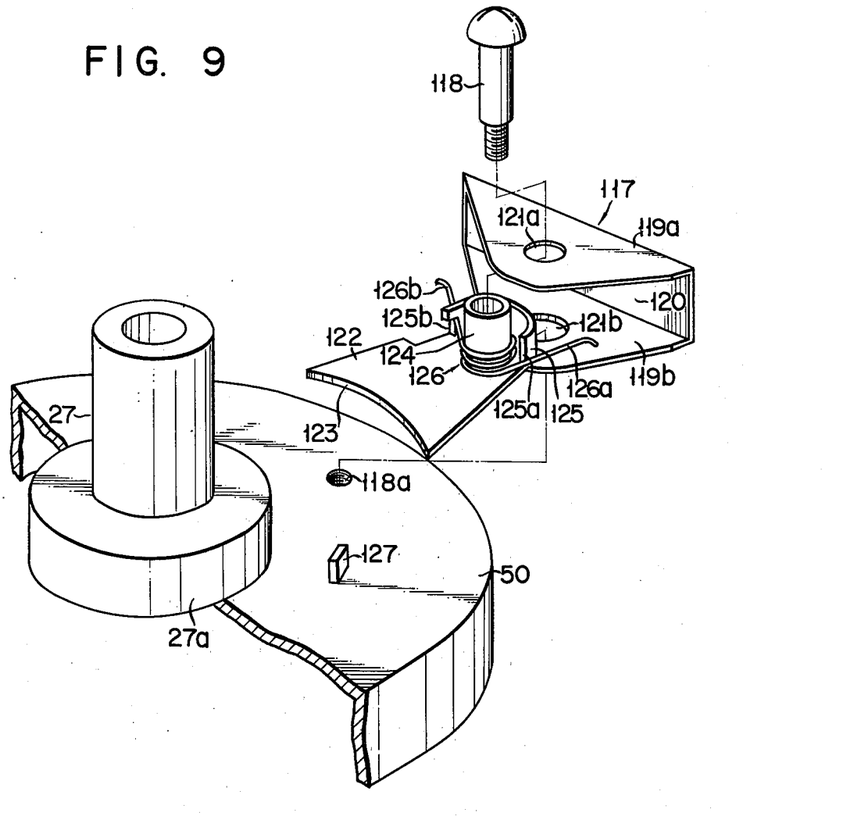
FIG. 9 is an exploded view of an abutment member and its associated parts of FIG. 7.

As shown in FIGS. 7, 8 and 9, to an upper portion of the brake drum 50 is rockably attached through a screw 118 an abutment member 117 corresponding to the abutment member 80 of the above-mentioned embodiment, said screw 118 being screwed into a threaded hole 118a of the brake drum 50. The abutment member 117 has upper and lower horizontal portions 119a, 119b each having a configuration approximate to an isosceles triangle and a vertical portion 120 connecting both horizontal portions 119a, 119b. In the horizontal portions 119a, 119b are formed concentrical holes 121a, 121b for permitting the passage therethrough of the screw 118. The holes 121a, 121b are located on the bisector of the isosceles triangular so that the right and left portions of the abutment member 117 become substantially equal in respect of weight. A spring holder 122 has a circular arc-shaped engagement face 123 compensatingly engageable with an increased diameter-cylindrical portion 27a formed on the coupling 27 and a cylindrical portion 124 for permitting the passage therethrough of the screw 118, and has the cylindrical portion 27 inserted between the horizontal portions 119a, 119b of the abutment member 117. The spring holder 122 is so fixed to the brake drum 50 as to be unable to be rocked, by engagement of the cylindrical portion 27a with the engagement face 123 and insertion of the screw 118 into the cylindrical portion 124. On the outer end of the spring holder 122 is integrally formed an erected wall 125 whose cross section is U-shaped. Both lateral ends of the erected wall 125 constitute spring stops 125a, 125b, respectively. For the cylindrical portion 124 of the spring holder 122 is provided a torsion coil spring 126, spring arms 126a, 126b of which are elastically engaged with the spring stops 125a, 125b, respectively. Tip ends of the spring arms 126a, 126b are allowed lightly to contact the vertical portion 120 of the abutment member 117. When the abutment member 117 is rocked in a direction indicated by an arrow K of FIG. 7, the spring arm 126b is elastically deformed to apply its biasing force acting on the abutment member 117 in the opposite direction to that indicated by the arrow K. In contrast, when the abutment member 117 is rocked in the opposite direction to that indicated by the arrow K, the spring arm 126a is elastically deformed to apply its biasing force acting in the arrow K-indicated direction to the abutment member. For this reason, the abutment member 117 is normally kept located at the position of FIG. 7 relative to the shaft 26. This position is situated substantially intermediate between both ends of the rocking range within which the abutment member 117 is rocked about the screw 118. At that position, the vertical portion 120 intersects a straight line connecting the center of the shaft 26 and the screw 118 substantially at right angles to the straight line. From the brake drum 50 is upwardly projected a stop 127, which is designed to limit the rocking movement of the abutment member 117 in the opposite direction to that indicated by the arrow K.

The operation of the above-mentioned modification will now be explained.

Figure 10:
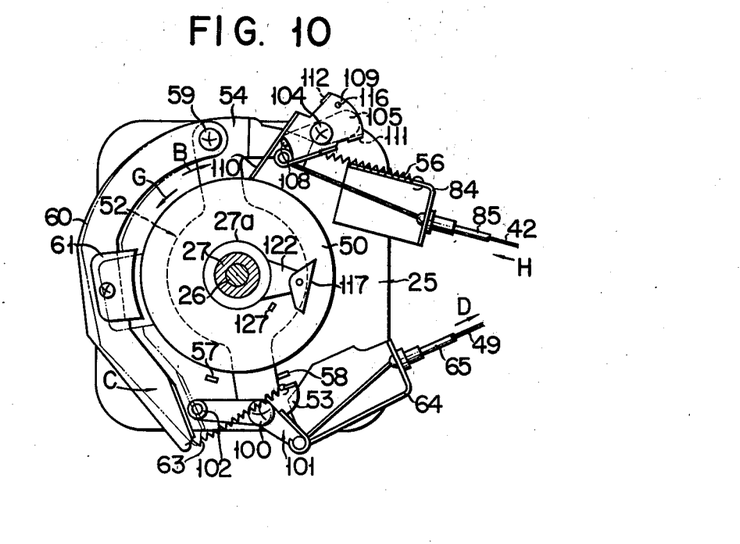
FIG. 10 is a view similar to FIG. 7, showing a condition in which the centrifugal dehydrator is in operation.
Figure 11:
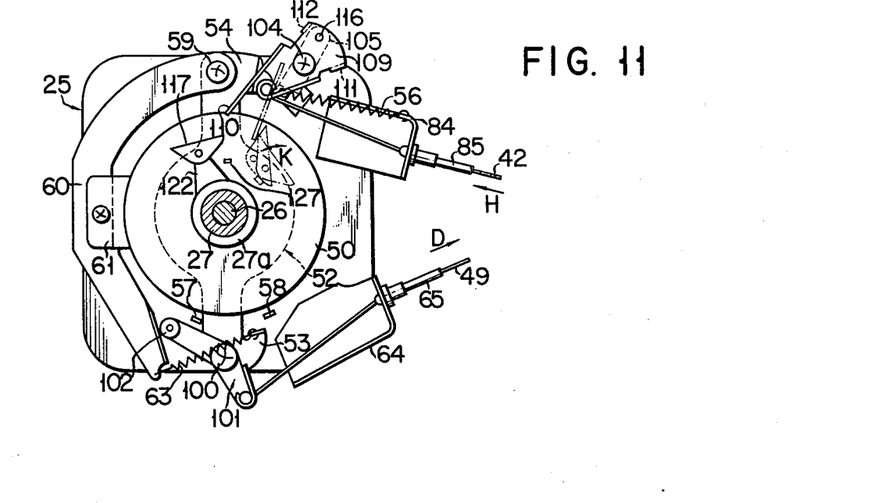
FIG. 11 is a view similar to FIG. 7, showing a condition in which the first rotation detection means goes wrong.
Figure 12:
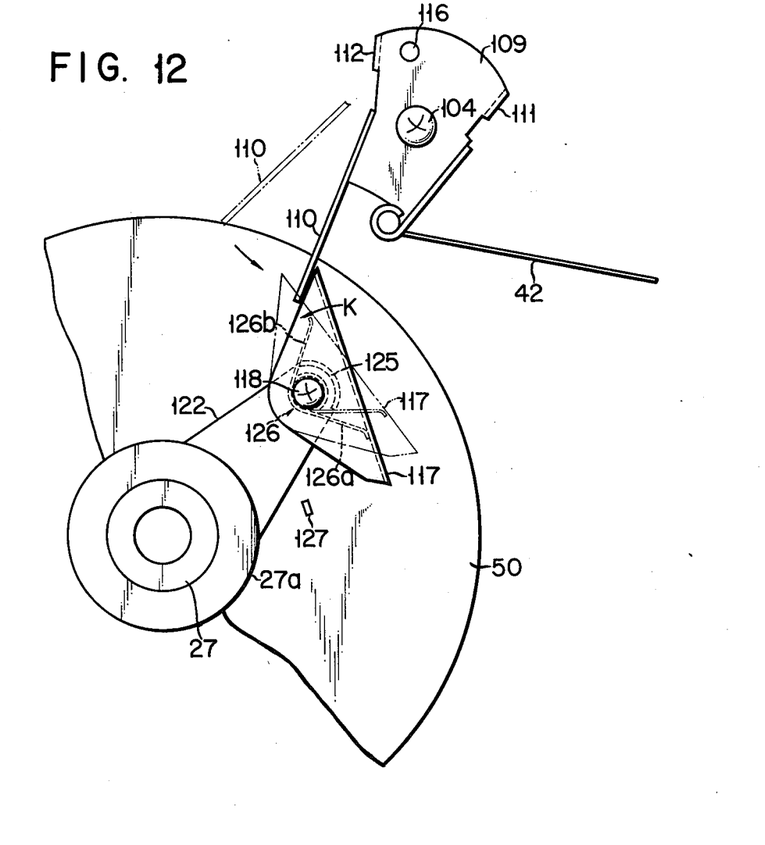
FIG. 12 schematically shows the displacement relationship between the operating lever of FIG. 7 and the abutment member, established when the operating lever is returned to the original position.
Figure 13:
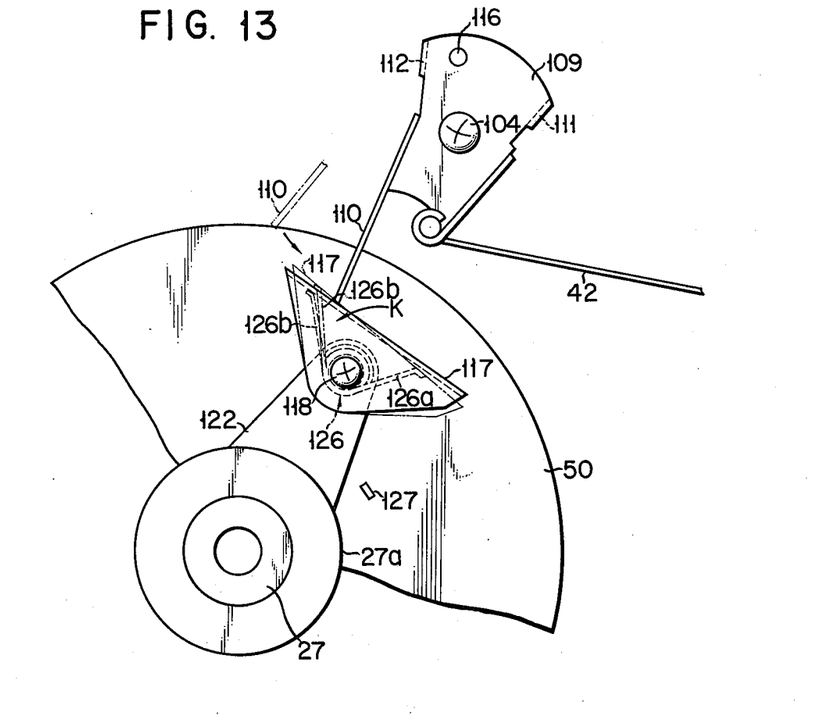
FIG. 13 is a view similar to FIG. 12, showing a condition in which the abutment member is located at a different position.

When the not shown outer lid is opened, the wire 49 cause the movable plate 52 to be rocked in the opposite direction to that indicated by the arrow B through the rocking lever 101 and the screw 100 against the biasing force of the tension spring 56, thereby causing the movable plate 52 to be brought to its displaced position shown in FIG. 10. In accordance with the rocking movement of the movable plate 52, the rocking lever 105 is rocked through the pin 108 in the opposite direction to that indicated by an arrow L to be moved to the position of FIG. 10. At this time, the operating lever 109 is moved jointly with the rocking lever 105 up to the position of FIG. 10, i.e., up to a displaced position at which the tip end of the rising portion 110 is situated outside the rotational locus of the abutment member 117. Simultaneously, the wire 42 is pulled in the arrow H-indicated direction to cause the not shown inner lid to be locked similarly to the above-mentioned embodiment. When the wire 49 is further pulled by the rocking movement of the outer lid, the rocking lever 101 is rocked in the arrow J-indicated direction against the biasing force of the spring 63 to cause the brake lever 60 to be rocked from the chain line-indicated position to the solid line-indicated position of FIG. 10. At this time, the brake shoe 61 is separated from the brake drum 50 to permit free rotation of the brake drum. Since the right and left portions of the abutment member 117 as imaginarily divided with the screw 118 as a center are well balanced in respect of weight, even if, during the rotation of the brake drum, a centrifugal force acts on the abutment member 117, this member is always kept at the position of FIG. 10 relative to the shaft 26.

When the outer lid is opened and the wire 49 is thus loosened, so long as the brake drum 50 is rotating due to inertia, the movable plate 52 is kept, as in the case of the above-mentioned embodiment, located at the displaced position of FIG. 10 by a frictional engagement of the brake shoe 61 with the brake drum 50. During this period of time, the wire 42 continues to be pulled by the operating lever 109, whereby the inner lid is kept locked. When the rotation of the brake drum 50 is stopped, the movable plate 52 is returned, by means of the spring 56, to the original position of FIG. 7 and simultaneously the operating lever 109 is rocked in the arrow L-indicated direction through the pin 108 so as to loosen the wire 42, thereby unlocking the inner lid.

Where, as in the case of the above-mentioned embodiment, abnormalities such as an excessive wear of the brake shoe 61 or the like have occurred, though, after the wire 49 is loosened, the brake drum 50 is still rotating due to inertia, the movable plate 52 is returned to the original position (FIG. 11) by means of the spring 56. At this time, as shown by chain lines of FIG. 11, the rising portion 110 of the operating lever 109 is displaced into the locus of the rotating abutment member 117 to abut against the same. Thus, the abutment member 117 is rocked against the biasing force of the spring arm 126a in the opposite direction to that indicated by the arrow K from a one-dot chain line-indicated position to a two-dot chain line-indicated position of FIG. 11 at which it is engaged with the stop 127, thereby causing the operating lever 109 to be brought to a solid line-indicated position, i.e., an operable position of FIG. 11 through the rising portion 110. Then the abutment member 117 is released from the rising portion 110 and in sequence returned to the original position by means of the spring arm 126a. The rocking movement of the abutment member 117 in the opposite direction to that indicated by the arrow K causes an increase in the engagement region in which the abutment member 117 is in engagement with the rising portion 110, thereby causing the operating lever 109 to be displaced more reliably. When the operating lever 109 is rocked up to the solid line-indicated position of FIG. 11, the stop portion 112 is allowed to abut on the rocking lever 105 to prevent any further rocking movement of the operating lever 109 and simultaneously to cause the ball 114 (FIG. 8) to be engaged with the bore by the spring 115, thereby keeping the operating lever located at the displaced position. In accordance with the displacement of the operating lever 109, the wire 42 is kept in the fully pulled condition to permit the inner lid to be kept locked as in the case of the above-mentioned embodiment. Since, thus, the rising portion 110 displaced to its operable position is not allowed to abut on the abutment member 117, the brake drum 50 continues its inertial rotation until it is stopped. Once the operating lever 109 has been displaced to the operable position of FIG. 11, the innner lid is kept locked unless the lever 109 is manually returned to the original position.

When, under the condition in which the brake shoe 61 is regularly operable, the operating lever 109 is returned, after the stoppage of the brake drum 50, from the displaced position of FIG. 10 to the original position of FIG. 7, the rising portion 110 of the operating lever 109 is sometimes allowed to contact the abutment member 117 depending upon the stopping position at which the abutment member 117 is stopped. If the abutment member 117 were fixedly attached to the brake drum 50, there would occur a danger that the inner lid becomes unable to be unlocked as a result of the operating lever 109 being prevented by the abutment member 117 from being returned to the original position. Since, however, in this modification, the abutment member 117 is rockably attached, that danger will not occur. This will now be described in detail with reference to FIGS. 12 and 13. For example, where the abutment member 117 is stopped at the position of FIG. 12, the operating lever 109 causes the abutment member 117 to be rocked against the biasing force of the spring arm 126a from a chain line-indicated position to a solid line-indicated position in the opposite direction to that indicated by the arrow K. Thus, the abutment member 117 can be returned from the chain line-indicated displaced position to the solid line-indicated original position. When the abutment member 117 is stopped at the position of FIG. 13, the operating lever 109 causes the abutment member 117 to be rocked against the biasing force of the spring arm 126b from the chain line-indicated position to the solid line-indicated position in the arrow K-indicated direction. Thus, the abutment member can be returned to the original position.

FIGS. 14 to 17 show another modification of the above-mentioned embodiment. This modification is substantially the same as the preceding one, except that the abutment member of this modification is different in construction from that of the preceding modification. Accordingly, also in this modification, the same parts and sections as those of the preceding modification are denoted by the same reference numerals, and therefore only different parts or sections are now explained.

Figure 14:
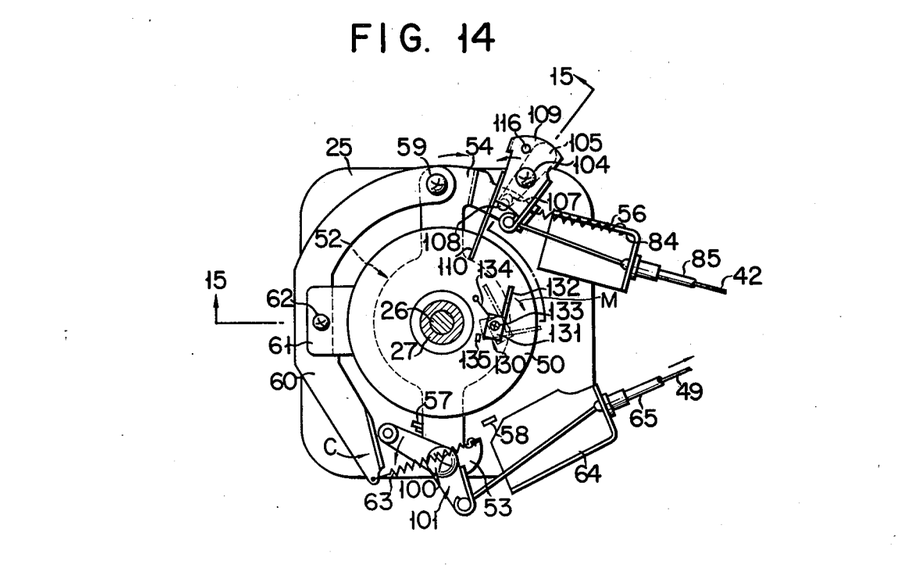
FIG. 14 is a view similar to FIG. 7, showing another modification of said embodiment.
Figure 15:
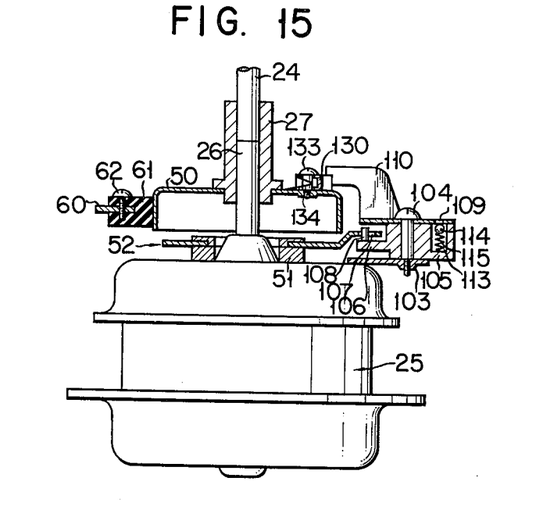
FIG. 15 is a sectional view taken along the line 15—15 of FIG. 14.

Referring to FIGS. 14 and 15, an abutment member 130 of this modification includes a body 131 whose longitudinal section assumes a horizontally thrown U-shape, and an abutment arm 132 extending from the body 131, and is rockably attached to an upper part of the brake disk 50 by means of a screw 133. This screw 133 is allowed to substantially pass through the point of mass of the abutment member 130, and accordingly, even when the brake drum 50 is rotating, the abutment member 130 is prevented from being rocked in a direction indicated by an arrow M or in the opposite direction to it. To the screw 133 is attached a torsion coil spring 134, one spring arm of which is fixed to the brake drum 50 and the other spring arm of which is fixed to the abutment member 130. The spring 134 is so designed that when the abutment member 130 is located at a solid line-indicated position of FIG. 14, its biasing force may not act on the abutment member. Accordingly, when the abutment member 130 is about to be rocked from its solid line-indicated position in the arrow M-indicated direction or in the opposite direction thereto, the biasing force of the spring 134 may act so as to return the abutment member to that solid line-indicated position. The abutment member 130 is rockable between a one dot chain line-indicated marginal position and a two dot chain line-indicated marginal position, and said solid line-indicated position is situated substantially intermediate between both marginal positions. A stop 135 provided on the brake drum 50 is designed as to limit the rocking movement of the abutment member in the arrow M-indicated direction. The rising portion 110 provided for the operating lever 109, when located at the position of FIG. 14, is situated within the rotational locus of the abutment arm 132 of the abutment member 130.

The operation of this modification is substantially the same as that of the above-mentioned embodiment and a detailed description thereof is omitted, except that the operation carried out where, after completion of the inertial rotation of the brake drum 50, the operating lever is returned to the original position will hereinafter be explained.

Figure 16:
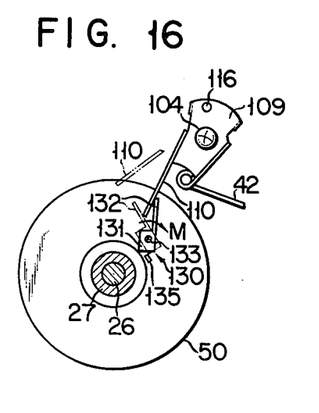
FIG. 16 schematically shows the displacement relationship between the operating lever of FIG. 14 and the abutment member, established when the operating lever is returned to the original position.
Figure 17:
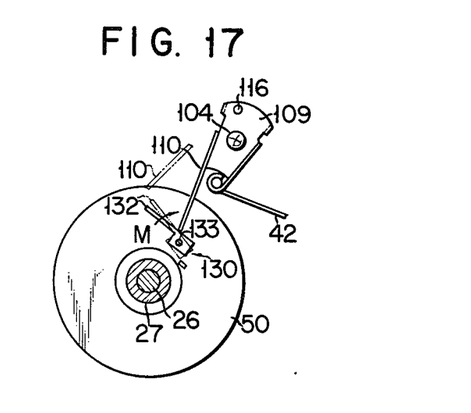
FIG. 17 is a view similar to FIG. 16, showing a condition in which the abutment member is located at a different position.

Where, after completion of the inertial rotation of the brake drum 50, the abutment member 130 is stopped at the position of FIG. 16, the operating lever 109 causes the abutment member 130 to be rocked against the biasing force of the spring 134 from the chain line-indicated position to the solid line-indicated position in the arrow M-indicated direction, whereby the abutment member 130 can be returned from the chain line-indicated displaced position to the solid line-indicated original position. Similarly, where the abutment member 130 is stopped at the position of FIG. 17, the operating lever 109 causes the abutment member to be rocked against the biasing force of the spring 134 from the chain line-indicated position to the solid line-indicated position in the opposite direction to that indicated by the arrow M, whereby the abutment member can be returned to the solid line-indicated original position.

What is claimed is:

1. A centrifugal dehydrator comprising:
   an outer casing having an opening,
   a spin basket facing said opening and rotatably disposed within said outer casing,
   a driving motor having a driving shaft connected to said spin basket for rotating said spin basket,
   switch means for connecting and disconnecting an electrical supply to said motor,
   an inner lid for said outer casing opening for opening and closing said opening,
   an outer lid for said outer casing opening for opening and closing said opening outside said inner lid,
   a movable member mounted about said shaft for movement between an original and displaced position,
   brake means including a first portion mounted on said shaft for rotation therewith and a second portion piovtably mounted on said member for movement between a braking position engaging said first portion and a release position,
   means connecting said second portion to said outer lid for causing said second portion to move to said braking position when said outer lid is opened and to move to said release position when said outer lid is closed, the force produced by the shaft rotation and resultant engagement of said first and second portions urging said member to said displaced position is less than a given value,
   lock means mounted for movement between a locking position engaging said inner door for preventing opening said inner door and a release position, and
   means connecting said member to said lock means for causing said lock means to move to said locking position when said member is in said displaced position and to move to said release position when said member is in said original position,
   means for urging said member toward said original position with a force greater than said given value, and
   means for connecting said switch means to said outer lid for causing said switch means to disconnect when said outer lid is opened and connect when said outer lid is closed.

2. A centrifugal dehydrator according to claim 1, wherein said first portion includes a brake drum fixed to said driving shaft and a said second portion includes a brake shoe frictionally engageable with said brake drum.

3. A centrifugal dehydrator according to claim 1, which further comprises means for detecting that said first rotation-detecting means is unable to function and causing said lock means to lock the inner lid to its locked position during the inertial rotation of the spin basket.

4. A centrifugal dehydrator according to claim 3, wherein said detecting means includes an abutmment member connected to said driving shaft so as to rotate describing a prescribed locus, and an operating lever associated with said movable member so that when said movable member is located at its displaced position, said operating lever is located outside said prescribed locus, and that when said movable member is located at its original position, said operating lever is located inside said prescribed locus, whereby said abutment member abuts on said operating lever during the inertial rotation of the spin basket, when said movable member is in said original position to cause said operating lever to move to an operable position permitting said lock means to lock said inner lid to its closed position.

5. A centrifugal dehydrator according to claim 4, wherein said detecting means further includes a pivot for rockably supporting one end of said abutment member so as to permit the same to be outwardly rocked due to the centrifugal force during the inertial rotation of the spin basket, and a spring member connected to said abutment member so as to permit the other end of the abutment member to be kept inwardly located during the stoppage of said spin basket, whereby said operating lever is arranged to abut on said outwardly rocked abutment member.

6. A centrifugal dehydrator according to claim 4, wherein said detecting means further includes a pivot for rockably supporting said abutment member at a point thereof for permitting the weight balancing thereof to be achieved, and a spring member for permitting said abutment member to be kept located substantially intermediate between both ends of the rocking range within which said abutment member is rocked.

7. A centrifugal dehydrator according to claim 6, wherein said abutment member takes the form of a substantially isosceles triangle when viewed from above and said spring member has a pair of spring arms for urging said abutment member so that the base of said isosceles triangle intersects a radial straight line of said driving shaft substantially at right angles thereto.

8. A centrifugal dehydrator according to claim 4, wherein said detecting means further includes a retaining mechanism for, when said operating lever has been moved to its operable position, retaining said operating lever at said operable position.

9. A centrifugal dehydrator according to claim 8, wherein said retaining mechanism includes a ball for contacting said operating lever and a spring for urging said ball toward said operating lever, said operating lever having a hole which is engaged with said ball when said operating lever is located at said operable position.

10. A dehydrator as in claim 1, wherein said member has first and second arms extending outward therefrom, one of said arms having a cam surface for engaging said lock means and member connecting means, said original position urging means including a spring connected to the other arm.

11. A dehydrator as in claim 10, wherein said first portion includes a brake drum and said second portion, a brake lever pivotably connected at one end of said one arm, a spring connecting the other end of said lever to the other arm and a brake shoe mounted on said lever for engaging said drum.

12. A dehydrator as in claim 11, wherein said means connecting said second portion to said outer lid includes a first wire and said means connecting said member to said lock means includes a second wire.

* * * * *